United States Patent
Koo et al.

(10) Patent No.: US 9,350,257 B2
(45) Date of Patent: May 24, 2016

(54) POWER SUPPLY APPARATUS AND DRIVING METHOD THEREOF

(71) Applicant: FAIRCHILD KOREA SEMICONDUCTOR LTD., Bucheon-si (KR)

(72) Inventors: Gwanbon Koo, Bucheon-si (KR); Dooyong Jung, Bucheon-si (KR); Jintae Kim, Seoul (KR); Taesung Kim, Incheon (KR); Youngbae Park, Bucheon-si (KR); Kyungseop Kim, Bucheon-si (KR); Donghye Cho, Seoul (KR)

(73) Assignee: Fairchild Korea Semiconductor LTD (KR)

( * ) Notice: Subject to any disclaimer, the term of this patent is extended or adjusted under 35 U.S.C. 154(b) by 0 days.

(21) Appl. No.: 14/520,410

(22) Filed: Oct. 22, 2014

(65) Prior Publication Data

US 2015/0109828 A1 Apr. 23, 2015

(30) Foreign Application Priority Data

Oct. 22, 2013 (KR) .................. 10-2013-0126171

(51) Int. Cl.
*H02M 3/335* (2006.01)
*H02J 3/38* (2006.01)
*H02M 1/00* (2006.01)

(52) U.S. Cl.
CPC ...... *H02M 3/33561* (2013.01); *H02M 3/33553* (2013.01); *H02J 3/383* (2013.01); *H02M 2001/0048* (2013.01); *H02M 2001/0077* (2013.01); *Y02B 70/1491* (2013.01); *Y02E 10/563* (2013.01)

(58) Field of Classification Search
CPC . H02M 3/33569; H02M 7/493; H02M 7/537; H02M 7/003; H02J 1/102
USPC ....................... 363/16, 65, 71, 131
See application file for complete search history.

(56) References Cited

U.S. PATENT DOCUMENTS

| | | | | |
|---|---|---|---|---|
| 3,515,974 A * | 6/1970 | Stich | ................. | H02J 1/102 331/112 |
| 4,816,739 A * | 3/1989 | Sakurai | ............... | H02M 3/1584 323/222 |
| 5,404,092 A * | 4/1995 | Gegner | ............... | H02M 1/4208 323/207 |
| 5,751,150 A * | 5/1998 | Rippel | ............... | G01R 31/2841 324/537 |
| 5,768,117 A * | 6/1998 | Takahashi | ............... | G05F 1/577 307/82 |
| 5,847,949 A * | 12/1998 | Jiang | ................. | H02M 3/33561 307/82 |
| 5,923,549 A * | 7/1999 | Kobayashi | .......... | H02M 7/4807 363/17 |
| 5,929,614 A | 7/1999 | Copple | | |
| 6,243,277 B1 * | 6/2001 | Sun | ........................ | H02J 7/34 323/222 |
| 6,356,467 B1 * | 3/2002 | Belehradek, Jr. | ....... | H02M 7/48 363/24 |
| 6,370,047 B1 * | 4/2002 | Mallory | ................. | H02M 1/10 363/65 |
| 7,915,757 B2 * | 3/2011 | Kim | .................. | H02M 3/33561 307/31 |

FOREIGN PATENT DOCUMENTS

KR 1020130020397 2/2013

* cited by examiner

*Primary Examiner* — Adolf Berhane
(74) *Attorney, Agent, or Firm* — Grossman Tucker Perreault & Pfleger PLLC

(57) ABSTRACT

A power supply apparatus and a driving method thereof are disclosed. The power supply apparatus includes a first converter and a second converter. The first converter is operated to acquire a first gain when an input voltage is included in a first range or a second range that is lower than a first range and outputs a first output voltage and a second output voltage by converting the input voltage. In addition, the second converter is operated when the input voltage is included in the first range and outputs a third output voltage by converting the second output voltage.

20 Claims, 6 Drawing Sheets

POWER SUPPLY APPARATUS AND DRIVING METHOD THEREOF

CROSS-REFERENCE TO RELATED APPLICATION

This application claims priority to and the benefit of Korean Patent Application No. 10-2013-0126171 filed in the Korean Intellectual Property Office on Oct. 22, 2013, the entire contents of which are incorporated herein by reference.

BACKGROUND OF THE INVENTION (a) Field of the Invention

The present invention relates to a power supply apparatus and a driving method thereof.

(b) Description of the Related Art

Recently, renewable energy has been spotlighted due to problems such as environment destruction, resource exhaustion, and the like. The renewable energy includes photovoltaic, wind power, wave power, tidal power, terrestrial heat, and the like, and particularly, a photovoltaic system has been widely used as an apparatus for converting light irradiated from the sun to electric energy.

Such a photovoltaic system includes a solar cell converting light to electric energy and a power supply apparatus converting a voltage output from the solar cell to a desired output voltage. When the photovoltaic system is connected to a grid, the power supply apparatus includes a DC-DC converter boosting a DC voltage to another DC voltage and an inverter converting an output of the DC-DC convert to an AC voltage.

In general, a range of the voltage output from the solar cell is as wide as about 25V to about 60V, and a DC-DC converter that converts a voltage of such a wide range to a high output voltage (e.g., 400V) needs to be designed.

However, when a DC-DC converter is designed to process such a wide range input voltage, efficiency may be deteriorated. Particularly, when an LLC converter is used as the DC-DC converter, efficiency can be increased, but the LLC converter causes an increase of conduction loss, thereby deteriorating efficiency when using a wide input voltage.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a power supply apparatus that can process an input voltage of a wide range, and a method for driving the same.

According to an exemplary embodiment of the present invention, a power supply apparatus is supplied. The power supply apparatus includes a first converter operated to acquire a first gain when an input voltage is included in a first range and outputting a first output voltage and a second output voltage by converting the input voltage and a second converter operated when the input voltage is included in the first range and outputting a third output voltage by converting the second output voltage.

When the input voltage is included in a second range that is higher than the first range, the first converter may be operated to acquire the first gain and outputs the first output voltage and the second output voltage by converting the input voltage.

When the input voltage is included in a third range that is higher than the second range, the first converter may be operated to acquire a second gain that is lower than the first gain.

The second converter is not operated when the input voltage is included in the second range and may do not output the third output voltage.

The second converter is not operated when the input voltage is included in the third range and may do not output the third output voltage.

The first gain may be a fixed gain.

The first converter may be an LLC resonance type converter having a fixed switching frequency.

The first converter may be operated in a burst mode when the input voltage is included in the third range.

The first converter may reduce a switching duty when the input voltage is included in the third range.

The input voltage may be output from a solar cell.

The second range may be a range of a voltage output from the solar cell by control of a maximum power point tracking (MPPT) controller.

The LLC resonance type converter may include: a switching unit switching the input voltage; a capacitor of which a first end is connected to the switching unit; an inductor of which a first end is connected to a second end of the capacitor; a transformer including a primary wire connected between the second end of the inductor and a ground; a first output unit connected to a secondary wire of the transformer and outputting the first output voltage; and a second output unit connected to the secondary wire of the transformer and outputting the second output voltage.

The switching unit may have a half-bridge structure and the first output unit may have a voltage-doubler structure.

The switching unit may have a full-bridge structure and the first output unit may have a voltage-doubler structure.

The power supply apparatus may further include an inverter receiving the sum of the first output voltage and the third output voltage and converting the sum to an AC voltage.

According to another exemplary embodiment of the present invention, a method for driving a power supply apparatus may be provided. The method for driving the power supply apparatus includes: sensing an input voltage; converting the input voltage to a first output voltage and a second output voltage with a first gain when the sensed input voltage is included in a first range; converting the second output voltage to a third output voltage when the sensed input voltage is included in the first range; and merging the first output voltage and the third output voltage to a fourth output voltage.

The method for driving the power supply apparatus may further include, when the sensed input voltage is included in a second range that is higher than the first range, converting the input voltage to the first output voltage and the second output voltage with the first gain.

The method for driving the power supply apparatus may further include, when the sensed input voltage is included in a third range that is higher than the second range, converting the input voltage with a second gain that is lower than the first gain.

When the sensed input voltage is included in the second range, the third output voltage may be not generated and the first output voltage is the fourth output voltage.

When the sensed input voltage is the third range, the third output voltage may not be generated.

The first gain may be a fixed gain.

The converting the input voltage may include providing an LLC resonance type converter and converting the input voltage to the first output voltage and the second output voltage with the first gain by fixing a switching frequency of the LLC resonance type converter.

According to the exemplary embodiments of the present invention, a power supply apparatus can be designed corresponding to a range of an input voltage, thereby increasing efficiency.

DETAILED DESCRIPTION OF THE EMBODIMENTS

Figure 1:
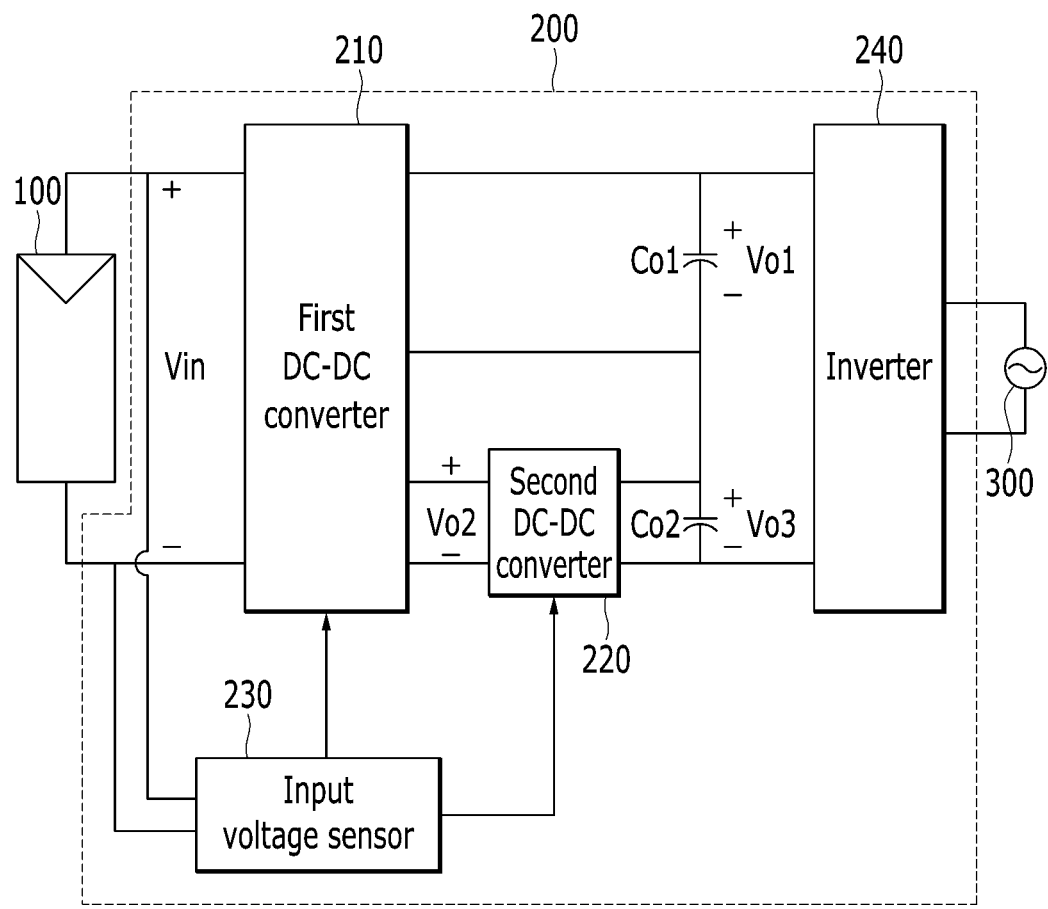
FIG. 1 shows a photovoltaic system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

FIG. 1 shows a photovoltaic system according to an exemplary embodiment of the present invention.

As shown in FIG. 1, a photovoltaic system according to an exemplary embodiment of the present invention includes a solar cell 100 and a power supply apparatus 200.

The solar cell 100 converts light emitted from sun to electric energy, and outputs a voltage to the power supply apparatus 200. In FIG. 1, a voltage output from the solar cell 100 is denoted by Vin and Vin is an input voltage of the power supply apparatus 200. The input voltage Vin of the power supply apparatus 200 output from the solar cell 100 may vary depending on a capacity of the solar cell 100 within a relative wide range voltage (i.e. 25V~60V).

In order to supply maximum power, the solar cell 100 is controlled by a maximum power point tracking (MPPT) controller, and the solar cell 100 can output a voltage corresponding to a predetermined range by the MPPT controller. In the following description, a range of a voltage output from the solar cell 100 by control of the MPPT controller is called a first range, a range lower than the first range is called a second range, and a range higher than the first range is called a third range. For example, the first range may be 44V to 48V, the second range may be less than 44V, and the third range may exceed 48V. As described above, the voltage output from the solar cell 100 may be a relatively wide range from 25V to 60V, but a range of the actual voltage Vin output from the solar cell 100 can be reduced from 44V to 48V approximately, which is not so wide due to the control of the MPPT controller.

The power supply apparatus 200 according to the exemplary embodiment of the present invention converts the voltage Vin output from the solar cell 100 to a desired output voltage. As shown in FIG. 1, the power supply apparatus 200 according to the exemplary embodiment of the present invention includes a first DC-DC converter 210, a second DC-DC converter 220, an input voltage sensor 230, and an inverter 240.

The first DC-DC converter 210 outputs a first output voltage Vo1 and a second output voltage Vo2 by converting a DC voltage Vin output from the solar cell 100.

When a range of the voltage Vin output from the solar cell 100 is the first range or the second range, the first DC-DC converter 210 according to the exemplary embodiment of the present invention is operated to gain a fixed first gain (i.e., the output voltage over the input voltage). Meanwhile, when the first DC-DC converter 210 is realized as an LLC converter as shown in FIG. 3 to FIG. 6, a fixed gain can be acquired by fixing a switching frequency. In addition, when the first DC-DC converter 210 is realized as a boost converter, a fixed gain can be acquired by fixing a switching duty. In case of a converter that can control a gain through a switching frequency and a switching duty, a fixed gain can be acquired by fixing the switching frequency and the switching duty.

When a range of the output voltage Vin of the solar cell 100 is the third range, the first DC-DC converter 210 is operated to acquire a gain that is lower than the first gain. When the first DC-DC converter 210 is operated in a burst mode or a turn-on time of the switch is decreased, a gain that is lower than the first gain may be acquired.

The second DC-DC converter 220 receives the second output voltage Vo2 of the first DC-DC converter 210 and outputs the third voltage Vo3 by converting the second output voltage Vo2. The second DC-DC converter according to the exemplary embodiment of the present invention is operated only when the range of the output voltage Vin of the solar cell 100 is the second range and outputs the third output voltage Vo3.

The input voltage sensor 230 is connected to both ends of the solar cell 100 and senses the voltage Vin output from the solar cell 100, and transmits information on the sensed voltage Vin to the first DC-DC converter 210 and the second DC-DC converter 220. In FIG. 1, the input voltage sensor 230 is connected to both ends of the solar cell 100 to sense the output voltage Vin of the solar cell 100, but the input voltage sensor 230 may be connected to other portion to sense a voltage corresponding to the input voltage Vin. For example, the input voltage sensor 230 can be connected to a predetermined location in an internal circuit of the first DC-DC converter 210 to sense a voltage corresponding to the input voltage Vin, and this is known to a person skilled in the art. Therefore, no further description will be provided.

The inverter 240 receives a voltage (Vo1+Vo3) that corresponds to the sum of the first output voltage Vo1 of the first DC-DC converter 210 and the third output voltage Vo3 of the second DC-DC converter 220, and converts the input DC voltage (Vo1+Vo3) to an AC voltage. The AC voltage output from the inverter 240 is supplied to a grid 300.

In FIG. 1, power output from the solar cell 100 of the photovoltaic system according to the exemplary embodiment of the present invention is supplied to the grid 300, but it may also be supplied to a general electronic device. In such a case, the inverter 240 may be omitted.

Figure 2:
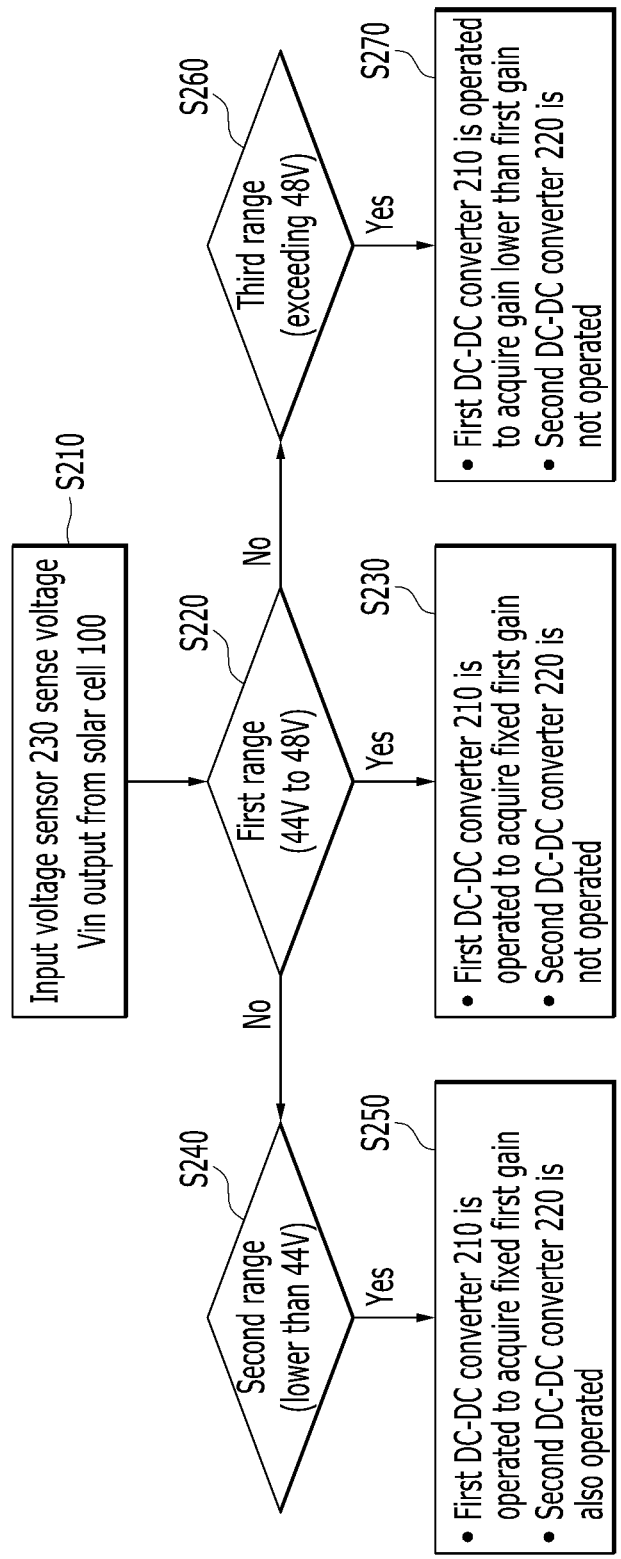
FIG. 2 shows operation of a power supply apparatus 200 according to the exemplary embodiment of the present invention.

Next, operation of the power supply apparatus 200 according to the exemplary embodiment of the present invention will be provided with reference to FIG. 2.

FIG. 2 shows operation of the power supply apparatus 200 according to the exemplary embodiment of the present invention. The power supply apparatus 200 according to the exemplary embodiment of the present invention is operated corresponding to a range of the voltage Vin output from the solar cell 100. That is, the first DC-DC converter 210 and the second DC-DC converter 220 change their operation according to whether the range of the voltage Vin output from the solar cell 100 is included in the first range, the second range, and the third range.

First, the input voltage sensor 230 senses the voltage Vin output from the solar cell 100, and transmits information on the sensed voltage Vin to the first DC-DC converter 210 and the second DC-DC converter 220 (S210).

When the voltage Vin output from the solar cell 100 is included in the first range (e.g., 44V to 48V) (S220), the first DC-DC converter 210 is operated to acquire a fixed first gain (S230). In this case, the second DC-DC converter 220 is not operated. Then, only the output voltage Vo1 of the first DC-DC converter 210 is input to the inverter 240. Since the gain of the first DC-DC converter 210 is fixed, a final output voltage of the DC-DC converter 200 can be changed according to change of the input voltage Vin.

When the voltage Vin output from the solar cell 100 is included in the second range (e.g., less than 44V) (S240), the first DC-DC converter 210 is operated to acquire the fixed first gain (S250). In this case, the second DC-DC converter 220 is also operated (S250). Then, the sum of the output voltage Vo1 of the first DC-DC converter 210 and the output voltage Vo3 of the second DC-DC converter 220 is input to the inverter 240. Since the first DC-DC converter 210 is operated with the fixed first gain and the input voltage Vin is included in the second range that is lower than the first range, the output voltage Vo1 of the first DC-DC converter 210 is lower than a case of the input voltage Vin that is included in the second range. However, the second DC-DC converter 220 is operated and output the output voltage Vo3, and therefore the output voltage Vo1 of the first DC-DC converter 210 can be supplemented. Therefore, although the input voltage Vin is included in the second range, a voltage supplied to the inverter 240 is similar to a voltage in a case that the input voltage Vin is included in the first range.

When the voltage Vin output from the solar cell 100 is included in the third range (e.g., exceeding 48V) (S260), the first DC-DC converter 210 is operated to acquire a gain that is lower than the first gain (S270). In this case, the second DC-DC converter 220 is not operated (S270). Then, only the output voltage Vo1 of the first DC-DC converter 220 is input to the inverter 240. Since the input voltage Vin is included in the third range that is higher than the first range and the first DC-DC converter 210 has a low gain, a voltage substantially supplied to the inverter 240 is similar to a case of a voltage included in the first range.

As described above, the voltages Vin output from the solar cell 100 are mostly included in the first range due to control of the MPPT controller. Thus, the first DC-DC converter 210 can be designed to be fit into the first range that is lower than entire ranges (a range of voltage output from the solar cell 100) and the first DC-DC converter 210 has the fixed first gain, and therefore the efficiency of the first DC-DC converter 210 can be optimized.

Next, a detailed configuration of the first DC-DC converter 210 according to the exemplary embodiment of the present invention will be described with reference to FIG. 3 to FIG. 6.

Figure 3:
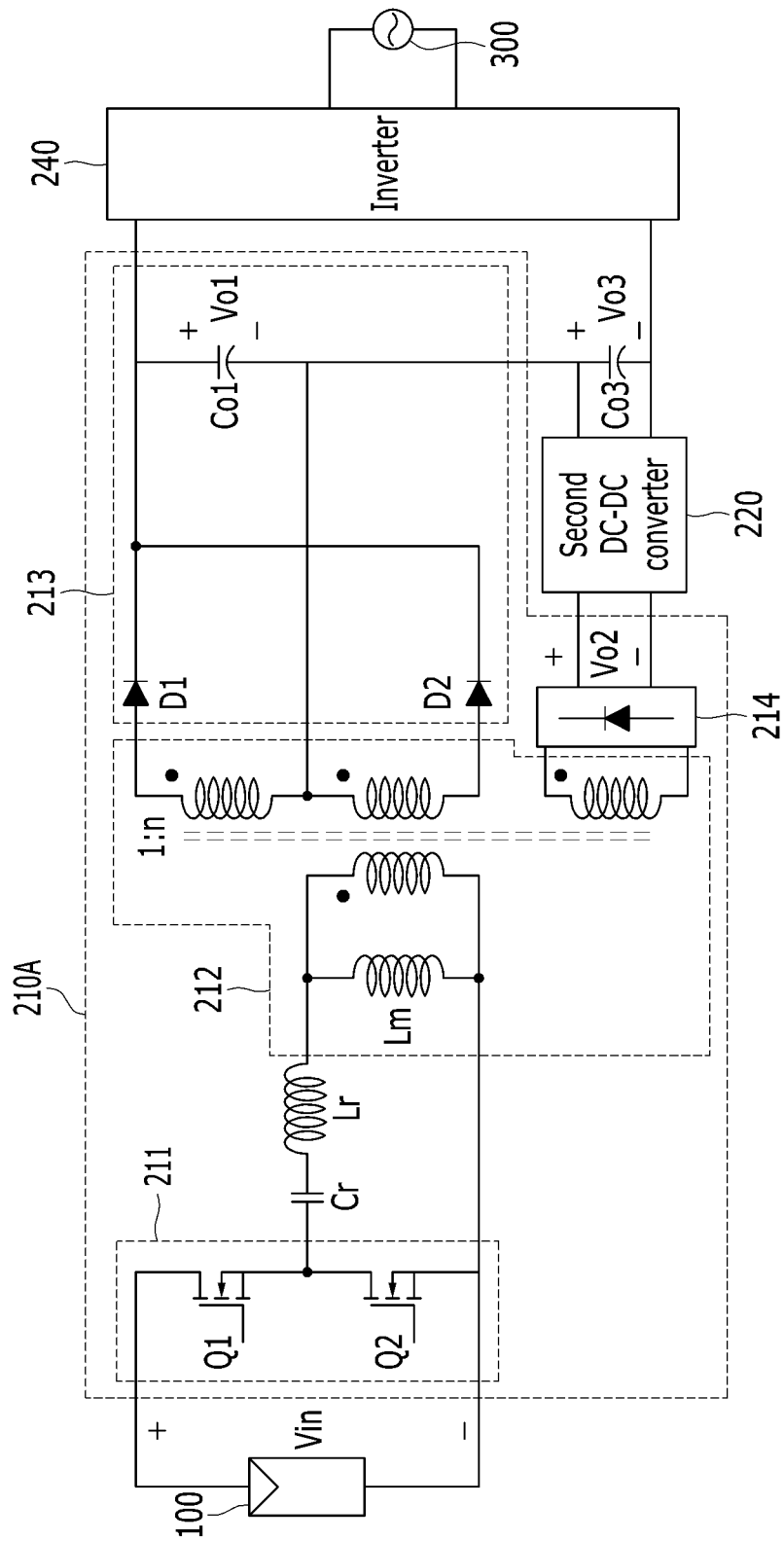
FIG. 3 shows a first DC-DC converter 210A according to the exemplary embodiment of the present invention.

FIG. 3 shows a first DC-DC converter 210A according to an exemplary embodiment of the present invention. The first DC-DC converter 210A according to the exemplary embodiment of the present invention has a structure of an LLC resonance type converter.

As shown in FIG. 3, the first DC-DC converter 210A according to the exemplary embodiment of the present invention includes a switching unit 211, a capacitor Cr, an inductor Lr, a transformer 212, a first output unit 213, and a second output unit 214.

The switching unit 211 includes a first switch Q1 and a second switch Q2, and first switch Q1 and the second switch Q2 are connected in series and complementarily switched. That is, the second switch Q2 is turned off when the first switch Q1 is turned on and the first switch Q1 is turned off when the second switch Q2 is turned on.

A first end of the capacitor Cr is connected to a node of the first switch Q1 and the second switch Q2, a second end of the capacitor Cr is connected to a first end of the inductor Lr, and a primary side of the transformer 212 is connected between a second end of the inductor Lr and a ground.

The transformer 212 is formed of a primary wire and a secondary wire, and transmits energy applied to the primary wire to the secondary wire. FIG. 3 illustrates modeling of a transformer when the transformer is substantially realized. When the transformer is substantially realized, a leakage inductance component and a magnetizing inductance component are generated, and the magnetizing inductance component is denoted by $L_m$ in FIG. 3. Meanwhile, the inductor Lr can be realized not only using the leakage inductance component of the transformer 212 but also using an additional inductor. A turn ratio of the primary winding and the secondary winding is 1:n.

In the present exemplary embodiment, the transformer 212 has three secondary wires. Among the three secondary wires, two of them are used for the first output unit 213 and the rest one secondary wire is used for the second output unit 214.

The first output unit 213 includes a first diode D1, a second diode D2, and a first output capacitor Co1. When the first switch Q1 is turned on, the first diode D1 is turned on and a first output voltage Vo1 is charged to a first output capacitor Co1 through the turn-on first diode D1. In addition, when the second switch Q2 is turned on, a second diode D2 is turned on and the first output voltage Vo1 is charged to the first output capacitor Co1 through the turn-on second diode D2.

As shown in FIG. 3, the second output unit 214 may be directly connected to a second DC-DC converter without an output capacitor. In addition, although it is not illustrated in FIG. 3, the second output unit 214 may further include a capacitor and a second output voltage Vo2 may be charged to the capacitor.

The first DC-DC converter 210A according to the exemplary embodiment of the present invention uses resonance generated between the capacitor Cr, the inductor Lr, and the magnetizing inductance Lm of the transformer 212, and therefore the first DC-DC converter 210A is called an LLC resonance-type converter. In addition, the LLC resonance-type converter can be formed using various methods using a half-bridge, a full-bridge, and the like in addition to the method shown in FIG. 3.

Switching frequencies of the first and second switches Q1 and Q2 of the exemplary embodiment of the present invention are fixed when a voltage Vin output from the solar cell 100 is included in a first range or a second range. However, the switching frequency may be slightly changed in order to correspond to a low frequency ripple, e.g., 120 Hz ripple on the output voltage. As described, when the switching frequency is fixed in the LLC converter structure, a gain of the LLC resonance-type converter becomes a fixed first gain. The fixed switching frequency may be set to a resonance frequency of the LLC resonance-type converter.

The voltage Vin output from the first DC-DC converter 210A is fluctuated within a narrow range (i.e., the first range) by control of the MPPT, and in this case, the first DC-DC converter 210A has the fixed first gain and therefore an output voltage Vo1 thereof is also fluctuated according to the input voltage Vin. Meanwhile, a range of the output voltage Vo1 corresponds to a range in which an AC voltage converted from the output voltage Vo1 by the inverter 240 can be connected to a grid 300. That is, when the input voltage Vin is included in the first range, the range of the output voltage Vo1 output from the first DC-DC converter 210A corresponds to a range that the inverter 240 can manage in order to supply the grid AC line voltage.

In addition, since the first DC-DC converter 210A acquires a fixed first gain by being operated with a fixed frequency even through the input voltage Vin is in a second range, the first DC-DC converter 210A outputs a low output voltage Vo1 as the input voltage Vin is decreased. In this case, an AC voltage output from the inverter 240 is lower than a range that can be connected with a grid. Thus, a low output voltage Vo1 is supplemented by an output voltage Vo3 of a second DC-DC converter 220. The second DC-DC converter 220 keeps monitoring the first output voltage Vo1 and when the voltage Vo1 is decreased to a range that the inverter 240 cannot manage (i.e., a range that the AC voltage output from the inverter 240 cannot be connected to the grid), the second DC-DC converter 220 is operated with a duty ratio that is sufficient to fill such an insufficiency. Most of power is transmitted to the inverter 240 by the first DC-DC converter 210A and a part of the power is transmitted by the second DC-DC converter 220, and therefore efficiency of the entire DC-DC converter depends on the first DC-DC converter 210A. In this case, the LLC-resonance type first DC-DC converter 210A according to the exemplary embodiment of the present invention has the fixed first gain while being operated with the fixed frequency, thereby optimizing efficiency of the DC-DC converter.

Meanwhile, the LLC-resonance type first DC-DC converter 210A according to the exemplary embodiment of the present invention is operated with a burst mode or decreases a turn-on time of the switch when the voltage Vin output from the solar cell 100 is in a third range. When the voltage Vin output from the solar cell 100 is in the third range, the first switch Q1 and the second switch Q2 are iteratively turned on and turned off in the burst mode rather than normally switched. When the first DC-DC converter 210A is operated in the burst mode, a gain is decreased to be lower than the fixed first gain. A method for the burst operation is known to a person skilled in the art, and therefore no further description will be provided. In addition, when the voltage Vin output from the solar cell 100 is in the third range, a switching frequency of the first switch Q1 and the second switch Q2 are fixed but turn-on times thereof may be decreased. When the turn-on time of the first switch Q1 and the turn-on time of the second switch Q2 are decreased, the gain of the first DC-DC converter 210A is decreased to be lower than the fixed first gain. As described, the gain of the first DC-DC converter 210A is decreased in the third range to thereby set the output voltage Vo1 of the first DC-DC converter 210A to be similar to the case of the first range.

In general, an LLC resonance converter should be designed to have a low Q factor in order to cope with a wide input voltage range. However, voltages output from the solar cell 100 are mostly included in the first range by control of the MPPT controller. Therefore, the first DC-DC converter 210A according to the exemplary embodiment of the present invention mainly covers a first input voltage that is included in a narrow range, and accordingly the first DC-DC converter 210A has a high Q-factor. When the first DC-DC converter 210A has the high Q-factor, a conduction loss is decreased, thereby acquiring high efficiency.

Figure 4:
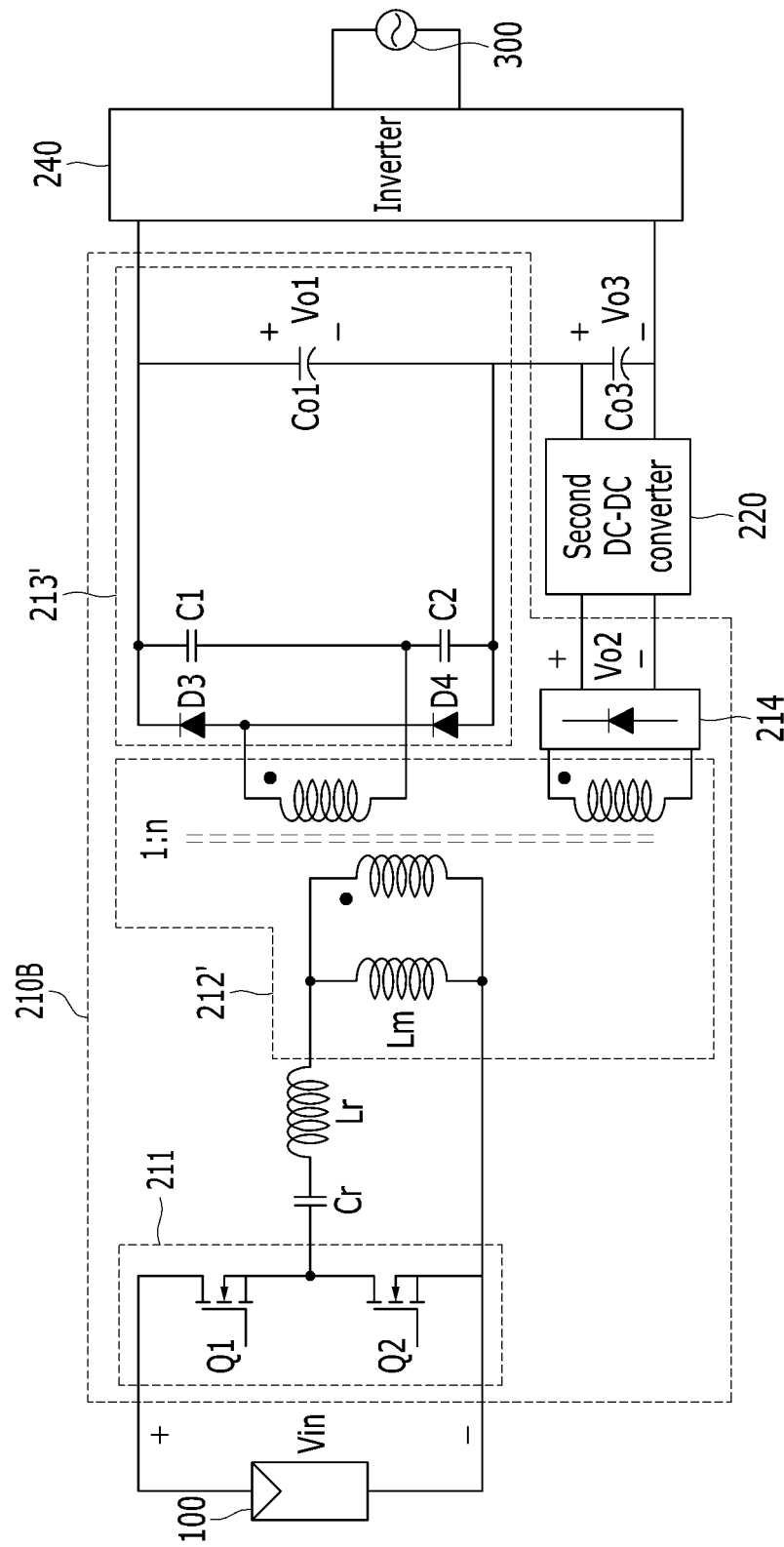
FIG. 4 shows a first DC-DC converter 210B according to another exemplary embodiment of the present invention.

FIG. 4 shows a first DC-DC converter 210B according to another exemplary embodiment of the present invention.

As shown in FIG. 4, the first DC-DC converter 210B according to the other exemplary embodiment of the present invention includes a switching unit 211, a capacitor Cr, an inductor Lr, a transformer 212', a first output unit 213', and a second output unit 214. The first DC-DC converter 210B of FIG. 4 is the same as the first DC-DC converter 210A of FIG. 3 in structure and operation, except that the first output unit 213' has a voltage-doubler structure. In addition, the transformer 212' includes two secondary wires. One of the two secondary wires is used in the first output unit 213' and the other secondary wire is used in the second output unit 214.

The first output unit 213' includes a third diode D3, a fourth diode D4, a first capacitor C1, and a second capacitor C2. When the first switch Q1 is turned on, the third diode D3 is turned on and accordingly a voltage is charged between both ends of the first capacitor C1. When the second switch Q2 is turned on, the fourth diode D4 is turned on and accordingly a voltage is charged between both ends of the second capacitor C2. The sum of the voltage charged to the first capacitor C1 and the voltage charged to the second capacitor C2 is charged between both ends of the first output capacitor Co1.

A structure of the first output unit 213' shown in FIG. 4 is called a voltage-doubler structure, and a voltage that corresponds to two times the first output voltage Vo1 of FIG. 3 can be generated.

Figure 5:
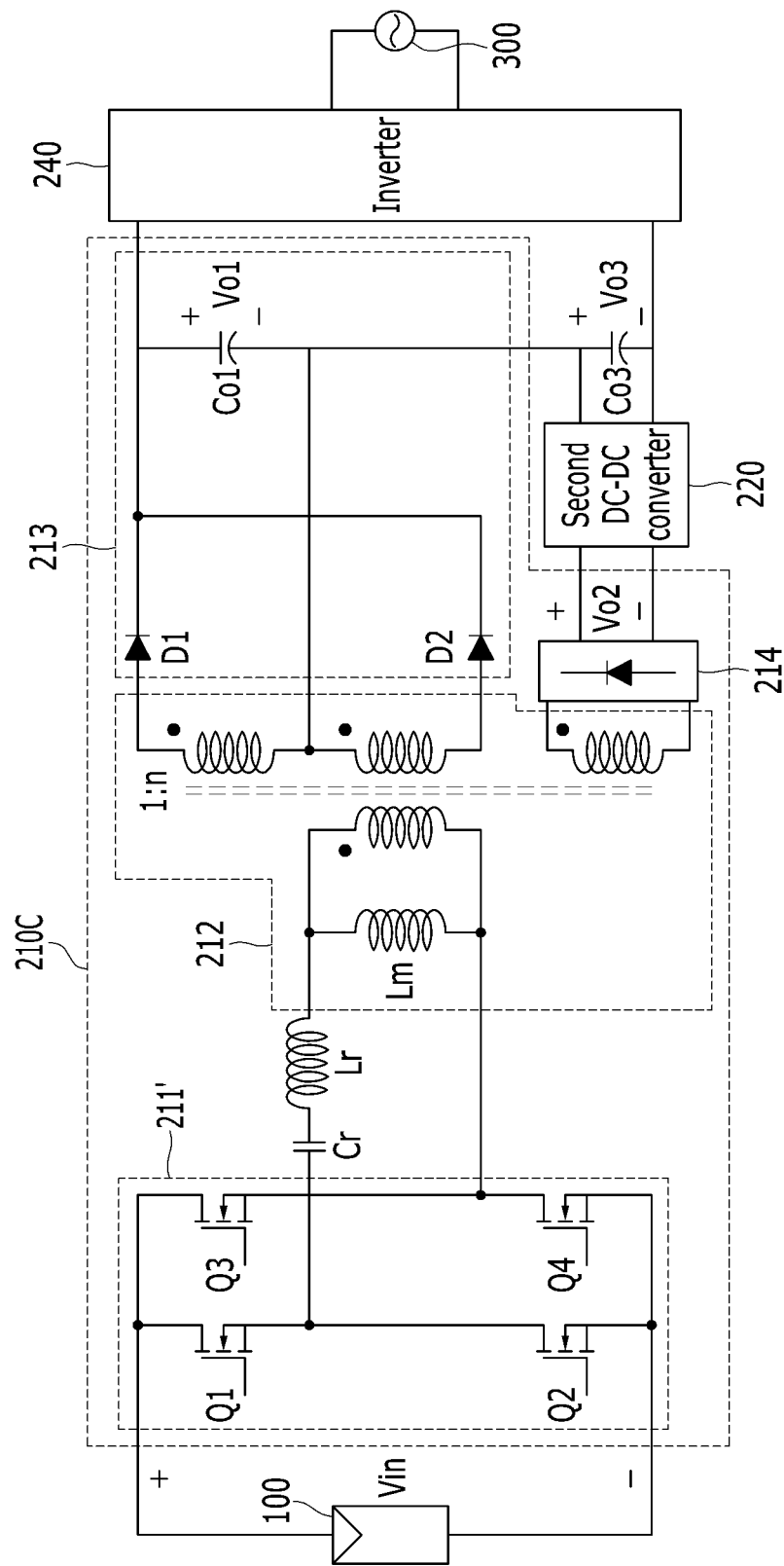
FIG. 5 shows a first DC-DC converter 210C according to another exemplary embodiment of the present invention.

FIG. 5 shows a first DC-DC converter 210C according to another exemplary embodiment of the present invention.

As shown in FIG. 5, the first DC-DC converter 210C according to the other exemplary embodiment of the present invention includes a switching unit 211', a capacitor Cr, an inductor Lr, a transformer 212, a first output unit 213, and a second output unit 214. The first DC-DC converter 210C of FIG. 5 is the same as the first DC-DC converter 210A of FIG. 3 in structure and operation, except that the switching unit 211' has a full-bridge structure.

The switching unit 211' includes a first switch Q1, a second switch Q2, a third switch Q3, and a fourth switch Q4, and the first to fourth switches Q1 to Q4 are connected in a full-bridge structure. The first switch Q1 and the fourth switch Q4 are simultaneously switched and the second switch Q2 and the third switch Q3 are simultaneously switched. In addition, the first and fourth switches Q1 and Q4 and the second and third switches Q2 and Q3 are complementarily switched.

As described, when the switching unit 211' is connected in the full-bridge structure unlike FIG. 3, an output voltage Vo1 of the first DC-DC converter 210C of FIG. 5 corresponds to two times the output voltage of the first DC-DC converter 210A of FIG. 3.

Figure 6:
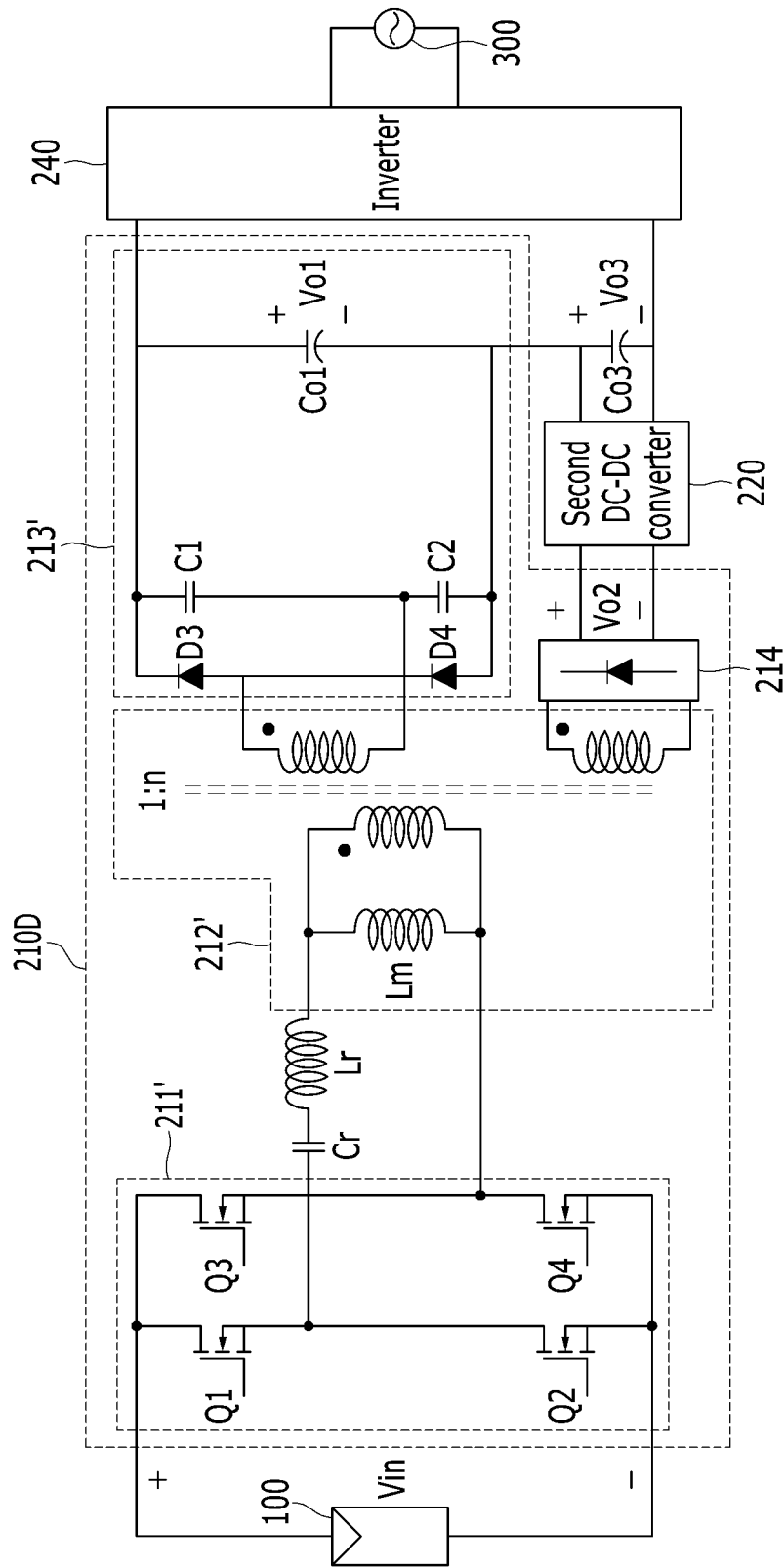
FIG. 6 shows a first DC-DC converter 210D according to another exemplary embodiment of the present invention.

FIG. 6 shows a first DC-DC converter 210D according to another exemplary embodiment of the present invention.

As shown in FIG. 6, the first DC-DC converter 210D according to the other exemplary embodiment of the present invention includes a switching unit 211', a capacitor Cr, an inductor Lr, a transformer 212', a first output unit 213', and a second output unit 214. The first DC-DC converter 210D of FIG. 6 is the same as the first DC-DC converter 210A of FIG. 3 in structure and operation, except that the switching unit 211' has a full-bridge structure and the first output unit 213' has a voltage-doubler structure.

As described, when the switching unit 211' is connected in the full-bridge structure and the first output unit 213' has the voltage-doubler structure, an output voltage Vo1 of the first DC-DC converter 210D of FIG. 6 corresponds to four times the output voltage of the first DC-DC converter 210A of FIG. 3.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A power supply apparatus comprising:
   a first converter operated to acquire a first gain when an input voltage is included in a first range and configured to output a first output voltage and a second output voltage by converting the input voltage; and
   a second converter operated when the input voltage is included in the first range and configured to output a third output voltage by converting the second output voltage,
   wherein when the input voltage is included in a second range that is higher than the first range, the second converter is not operated and does not output the third output voltage.

2. The power supply apparatus of claim 1, wherein when the input voltage is included in the second range, the first converter is operated to acquire the first gain and configured to output the first output voltage and the second output voltage by converting the input voltage.

3. The power supply apparatus of claim 2, wherein when the input voltage is included in a third range that is higher than the second range, the first converter is operated to acquire a second gain that is lower than the first gain.

4. The power supply apparatus of claim 3, wherein the second converter is not operated when the input voltage is included in the third range and does not output the third output voltage.

5. The power supply apparatus of claim 3, wherein the first converter is operated in a burst mode when the input voltage is included in the third range.

6. The power supply apparatus of claim 3, wherein the first converter reduces a switching duty when the input voltage is included in the third range.

7. The power supply apparatus of claim 2, wherein the input voltage is output from a solar cell.

8. The power supply apparatus of claim 7, wherein the second range is a range of a voltage output from the solar cell by control of a maximum power point tracking (MPPT) controller.

9. The power supply apparatus of claim 7, further comprising an inverter configured to receive a sum of the first output voltage and the third output voltage and configured to convert the sum to an AC voltage.

10. A power supply apparatus comprising:
    a first converter operated to acquire a first gain when an input voltage is included in a first range and configured to output a first output voltage and a second output voltage by converting the input voltage; and
    a second converter operated when the input voltage is included in the first range and configured to output a third output voltage by converting the second output voltage, wherein the first gain is a fixed gain and when the input voltage is included in a second range that is higher than the first range, the second converter is not operated and does not output the third output voltage.

11. The power supply apparatus of claim 10, wherein the first converter is an LLC resonance-type converter having a fixed switching frequency.

12. The power supply apparatus of claim 11, wherein the LLC resonance type converter comprises:
    a switching unit switching the input voltage;
    a capacitor including a first end connected to the switching unit;
    an inductor including a first end connected to a second end of the capacitor;
    a transformer including a primary wire connected between a second end of the inductor and a ground;
    a first output unit connected to a secondary wire of the transformer and outputting the first output voltage; and
    a second output unit connected to the secondary wire of the transformer and outputting the second output voltage.

13. The power supply apparatus of claim 12, wherein the switching unit comprises a half-bridge structure and the first output unit comprises a voltage-doubler structure.

14. The power supply apparatus of claim 12, wherein the switching unit comprises a full-bridge structure and the first output unit comprises a voltage-doubler structure.

15. A method for driving a power supply apparatus, comprising:
    sensing an input voltage;
    converting the input voltage to a first output voltage and a second output voltage with a first gain when the sensed input voltage is included in a first range;
    converting the second output voltage to a third output voltage when the sensed input voltage is included in the first range; and
    merging the first output voltage and the third output voltage to a fourth output voltage,
    wherein when the sensed input voltage is included in a second range that is higher than the first range, the third output voltage is not generated and the first output voltage is the fourth output voltage.

16. The method for driving the power supply apparatus of claim 15, further comprising, when the sensed input voltage is included in the second range, converting the input voltage to the first output voltage and the second output voltage with the first gain.

17. The method for driving the power supply apparatus of claim 16, further comprising, when the sensed input voltage is included in a third range that is higher than the second range, converting the input voltage with a second gain that is lower than the first gain.

18. The method for driving the power supply apparatus of claim 17, wherein when the sensed input voltage is included in the third range, the third output voltage is not generated.

19. A method for driving a power supply apparatus, comprising: sensing an input voltage; converting the input voltage to a first output voltage and a second output voltage with a first gain when the sensed input voltage is included in a first range;
    converting the second output voltage to a third output voltage when the sensed input voltage is included in the first range; and
    merging the first output voltage and the third output voltage to a fourth output voltage, wherein the first gain is a fixed gain and when the sensed input voltage is included in a second range that is higher than the first range, the third output voltage is not generated and the first output voltage is the fourth output voltage.

20. The method for driving the power supply apparatus of claim 19, wherein the converting the input voltage comprises:
providing an LLC resonance-type converter; and
converting the input voltage to the first output voltage and the second output voltage with the first gain by fixing a switching frequency of the LLC resonance-type converter.

* * * * *